May 19, 1970    T. L. HENNINGSSON    3,512,551

HEATING APPLIANCES

Filed March 27, 1968

INVENTOR
THOM LAGE HANNINGSSON
BY *Richards & Geier*
ATTORNEYS

# United States Patent Office 3,512,551
Patented May 19, 1970

3,512,551
HEATING APPLIANCES
Thom Lage Henningsson, 9 Nyodlingsvagen,
Sollentuna, Sweden
Filed Mar. 27, 1968, Ser. No. 716,585
Int. Cl. B01f 3/02
U.S. Cl. 137—599.1     3 Claims

ABSTRACT OF THE DISCLOSURE

A device for joining a heating appliance to the main flow pipe of a single duct heating system includes an inflow pipe connected to the heating appliance and an outflow pipe of smaller cross-section connected to the inflow pipe. A branch pipe constituting the flow pipe is connected to the junction of the two pipes and a return flow pipe connected to the heating appliance is also connected to the outflow pipe through a regulating valve.

---

This invention relates to a heating appliance and refers more particularly to a device for joining a heater to a main pipe of a single duct system and to means for regulating the device.

To date, the satisfactory connection of a heater to a single duct system has caused difficulties. These are, on the one hand, difficulties with the regulation of the heater so that it does not affect the other heaters of the system and, on the other hand, with achieving ease of control which facilitates the calculation and dimensioning of the entire system.

An object of the present invention is to eliminate these drawbacks of prior art devices.

Other objects will become apparent in the course of the following specification.

In the accomplishment of the objectives of the present invention it was found advisable to provide a shunt pipe system which comprises a pipe of larger cross-section connected to the inflow of the heater and a pipe of smaller cross-section connected to the outflow of the heater. A branch pipe is connected as a feed pipe for the heater with its one end to the section of the shunt connection between the two pipes with the larger and smaller cross-sections and with its other end connected to the heater, while the discharge pipe of the heater is connected to the outlet through the regulating valve.

The invention will appear more clearly from the following detailed description when taken in connection with the accompanying drawing, showing by way of example, a preferred embodiment of the inventive idea.

Figure 1:
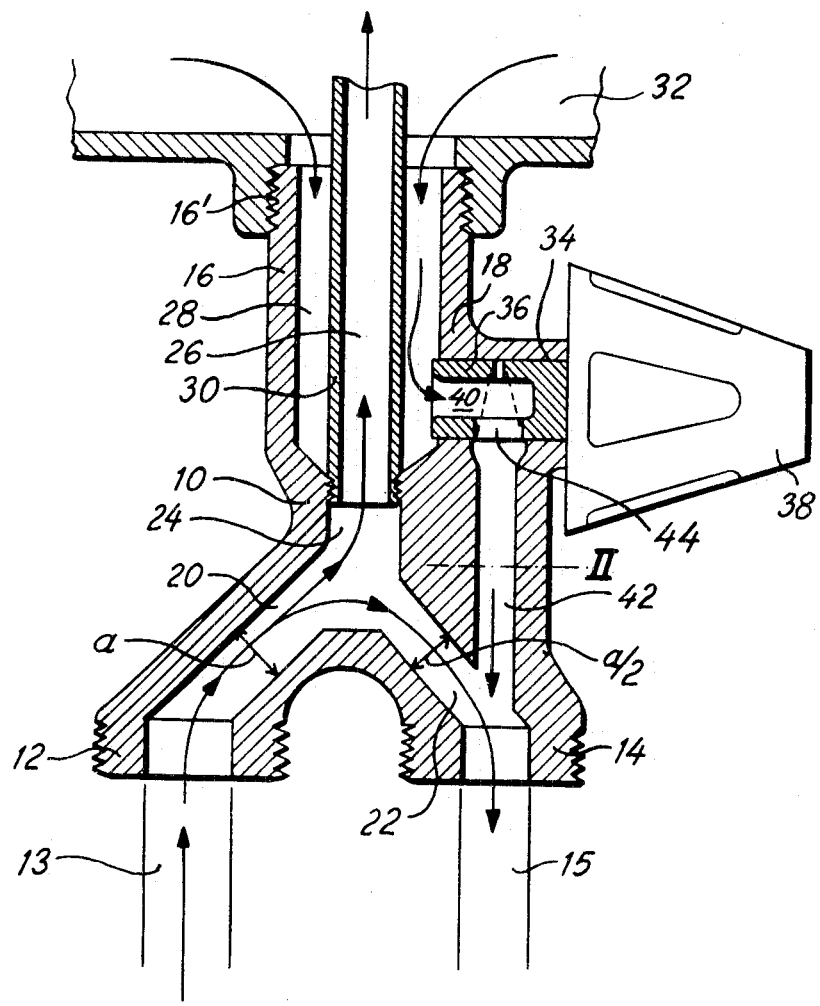
FIG. 1 is a section through a device constructed in accordance with the present invention.

The drawing shows a valve device for single duct systems which comprises a valve body 10 with an infeed connection 12 provided with a screw thread which is connected to a feed pipe 13, a discharge connection 14, having a screw thread which is connected to a return pipe 15, a connection pipe 16 for the heater and the valve housing 18. The supply connection and the discharge connection 12, 14 are coupled to one another by two channels 20, 22. The channel 20, which is connected to the feed connection 12, has a certain cross-section area $a$ and the second channel 22, connected to the discharge connection 14, has smaller cross-section area, which, for example, may be half of the one of channel 20, namely $a/2$. The relationship between the two cross-sections of the two channels 20, 22 may be varied so that the valve can be used for very different types of systems.

Figure 2:
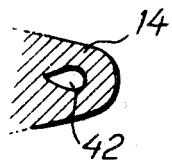
FIG. 2 is a partial section along the line II of FIG. 1.

Between the two channels 20, 22 there is a branch 24, which is connected to the connection pipe 16. The pipe 16 consists of two concentric channels, namely, an inner channel 26, formed by a pipe 30 screwed into the branch section 24 and extending as far as required into a heating appliance 32, and an outer channel 28 between the pipe 30 and the pipe 16. The pipe 16 has a threaded connection 16' on its outer end. The connection 16' is screwed into the heating appliance 32, while the pipe 30 extends a little into the heating appliance so as to separate supply from the discharge in the heating appliance. Above the branch section 24 the valve housing 18 is provided with a cylindrical bore 34, and with a rotatable plug 36 for the valve which is provided with a turning knob 38. The plug 36 is designed as a strong cylinder and has an axial channel 40, extending from channel 28 into the plug 36 to a channel 42, which has a V-shaped cross-section (FIG. 2) and leads to the bore 34, and connects the same to the lower part of the channel 22 at the discharge connection 14. The plug 36 has an opening 44 which is shaped in such a manner that the passage flow area from channel 40 to channel 42 can be varied between a maximum value and zero by the turning of the knob 38. The width of the opening 44 is greatest in the position illustrated in the drawing, then reduces gradually round the circumference of the plug and continues as a narrow and flat channel, which is cut into the circumference of the plug 36. The plug can be pre-adjusted according to the required output value of the heating appliance.

The valve system operates as follows:

The hot water enters at 12 from the pipe 13 or from the main pipe and is divided at the branch portion 24 into a first stream, which rises through the pipe 30 into the heating appliance 32, and into a second stream, which, through the channel 22, is directly discharged through the discharge connection 14. The cooled water from the heating appliance 32 flows out through the channel 28, the bore 40 in the plug 36, the channel 42 and the discharge connection 14 to the main pipe or return pipe 15. The amount of water flowing through the plug 36 can be regulated, as hereinbefore mentioned, between a maximum value, which it is preadjusted, and zero, without causing the input flow resistance of the valve system to change considerably so that the calculation of a central heating system is considerably facilitated by the valve system of the present invention. The input resistance can therefore be regarded as mainly constant, on account of the throttling in channel 22. This is the reason why the coefficient of resistance for the main pipe 13, 15, remains practically unchanged if the water flow is changed by the heating appliance by means of the valve 36.

When several heating appliances are used, they can be connected in succession, that is to say the return pipe 15 of one heater forms the feed pipe 13 of the subsequent heater in this single duct system and is connected to the same, so that all feed pipes and return pipes of a row of heaters form the main line.

Further advantages of the valve system according to the invention are as follows:

The flow resistance is variable in the actual heating circuit. Preset values can be graded on a unit-scale.

The heat emission of the heating appliance can be regulated in two ways:

In order to allow mass-produced standard sizes of heating appliances to be used, the required water flow through the heating circuit can be obtained by pre-adjustment of the plug 36. This adjustment value can be obtained in an electronic computer in conjunction with the dimensioning of the heating appliance.

Subsequently the heat emission of the heating appliance is individually and manually regulated between maximum and minimum value by means of the turning knob 38.

There is also the possibility of connecting a control device for automatic temperature regulation.

All pipe connections may be arranged above the floor, so that there are no pipe joints in the floor.

The connection to the main pipe 13, 15 can be effected by means of so-called compression couplings for different dimensions of the iron and copper pipes.

The valve system may be connected either from pipes in the floor to the center of the lower edge of the heating appliance or from vertical main pipes to the lower side portion of the heating appliance.

It is apparent that various other variations and modifications can be made in the described example within the scope of the present invention.

What is claimed is:

1. A single duct heating system for a plurality of heating appliances, comprising an inflow pipe, an outflow pipe, a valve-free shunt conduit having two channels, said channels having a joint interconnecting portion, one of said channels leading to the inflow pipe and the other one of said channels leading to the outflow pipe, the first-mentioned channel having a greater cross section than the second-mentioned channel, an inlet pipe having one end connected to said interconnecting portion and the other end extending into a heating appliance, a regulating valve, an outlet pipe having one end communicating with said heating appliance and the other end connected with said valve, and a further pipe having one end connected with said valve and the other end communicating with the second-mentioned channel at its juncture with said outflow pipe.

2. A system in accordance with claim 1, wherein said inlet pipe and said outlet pipe are concentric, said inlet pipe extending through said outlet pipe into said heating appliance.

3. A system in accordance with claim 1, comprising a single casing enclosing said shunt conduit, said inlet pipe and said outlet pipe and carrying said regulating valve, said casing being adapted to be attached to said heating appliance.

References Cited

UNITED STATES PATENTS 2,775,259  12/1956  Stiebel _____ 137—599.1

LOUIS K. RIMRODT, Primary Examiner

U.S. Cl. X.R.

137—561